JOHN P. SIMONS.
Improvement in Expanding Mandrels.

No. 122,920.  Patented Jan. 23, 1872.

Witnesses:
Fred.k Artos
M. M. Evans

Inventor:
John P. Simons
by his Atty.
A. H. & R. K. Evans 122,920

UNITED STATES PATENT OFFICE.

JOHN P. SIMONS, OF HOUSTON, TEXAS.

IMPROVEMENT IN EXPANDING MANDRELS.

Specification forming part of Letters Patent No. 122,920, dated January 23, 1872.

*To all whom it may concern:*

Be it known that I, JOHN P. SIMONS, of Houston, in the county of Harris and State of Texas, have invented certain Improvements in Mandrels and Chucks for Turning-Lathes, of which the following is a full, clear, and exact description, reference being had to the accompanying drawing making part of this specification, in which—

Figure 1:
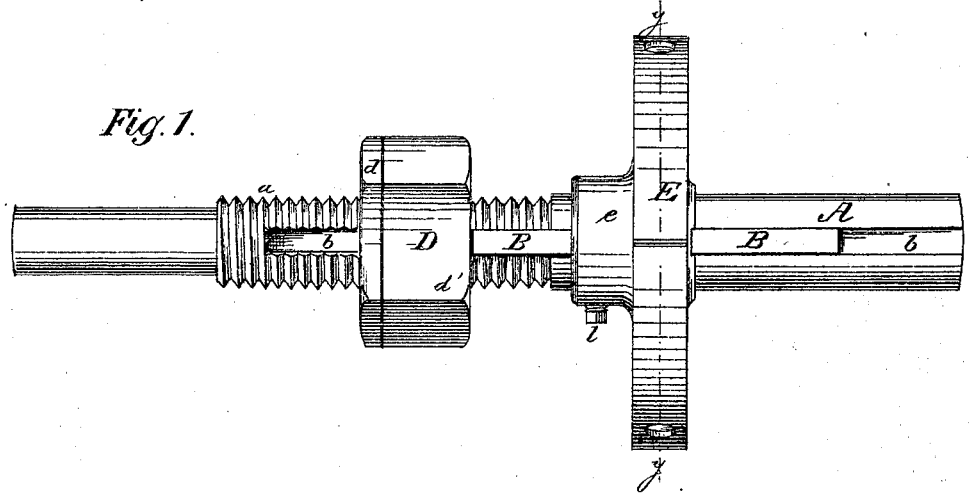
Figure 2:
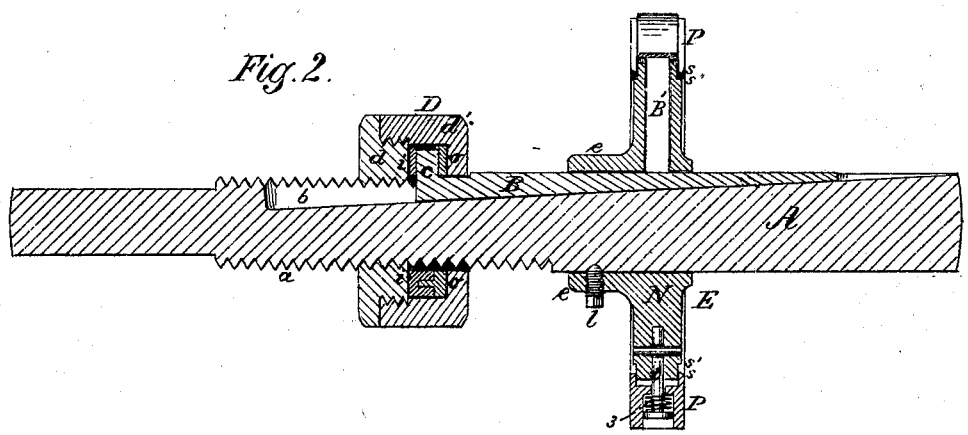
Figure 4:
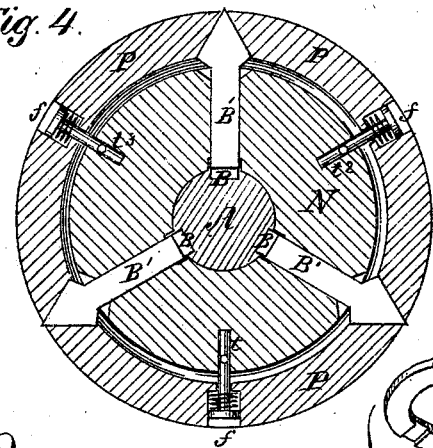
Figure 3:
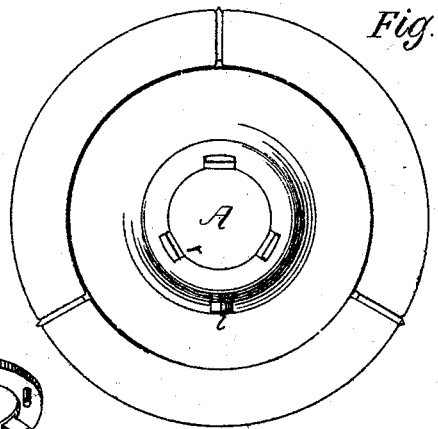
Figure 5:
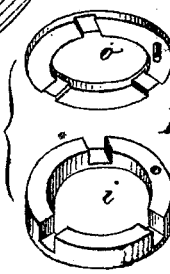

Figure 1 is a plan view of my mandrel and chuck. Fig. 2 is a sectional view of the same on the line $x\ x$ of Fig. 1. Fig. 3 is a plan view of the chuck detached. Fig. 4 is a sectional view of the chuck and mandrel on the line $y\ y$ of Fig. 1. Fig. 5 is a perspective view of the collar $i$ and washer $o$.

The object of my invention is to produce, first, an expanding mandrel which may be readily enlarged or diminished to suit the size of any annular article required to be turned in a lathe. It also consists in adding to the mandrel an expanding-chuck, by which the capacity of the mandrel is increased to any desired extent.

In the said drawing, A is a mandrel, provided with a screw-thread, $a\ a$, and has sunk into it longitudinal inclined grooves $b$. Fitted into these grooves are wedges B, having the incline of their sides to correspond to the line of inclination of the bottom of the grooves from the line of the screw-thread $a$. At their thickest ends the wedges are provided with a recess and shoulder, $c$. A nut, D, consisting of two parts, $d$ and $d'$, works on the screw-thread $a\ a$. The part $d'$ of the nut is reamed out and fits over the shoulder $c$ of the wedges, thus forming a collar around them. The part $d$ of the nut is screwed into the part $d'$, and also has a female screw cut in it to correspond with the thread $a$ on the mandrel. Around the mandrel, inside of the nut D, is an anti-friction collar, $i$, and the washer $o$. (See Fig. 5.) The faces of the collar and washer have depressions $n\ n\ n$ and $n'\ n'\ n'$, into which fit the shoulders $c$ of the wedges B. It will be readily seen that by this arrangement when the nut D is forced down the screw-thread $a\ a$ the wedges B, their heads remaining stationary in the collar $i$ and washer $o$, are pushed along the inclined grooves, and their upper edges rise above the screw-thread $a\ a$. My improved expanding-chuck is placed upon the mandrel and fixed in position by a set-screw, $l$, through the flange $e$. The chuck consists of a disk, N, made of metal or other suitable material. Radiating from the opening in the chuck for the mandrel to pass through are wedges B', shaped as shown in Fig. 4. When the chuck is in position each one of the wedges B' at the center bears directly over one of the wedges B on the mandrel, and when the wedges B are forced along the mandrel their upper edges bear against the ends of the wedges B' and press them outward equally. The disk N is surrounded by a rim, P, made into sections, the number of sections corresponding to the number of radial wedges. The sections of the rim are recessed along their inner edges and fit over corresponding shoulders in the disk N, as seen at $s\ s'$, Fig. 2, and have their ends beveled from the periphery toward the center at an angle like that of the heads of the radial wedges. In the center of each section of the rim is a recess, $f$, at the bottom of which is a hole through which passes the large-headed bolt $t$ into the disk N, where it is fastened with a pin, 2. Beneath the head and around the bolt $t$ in the recess $f$ is a spiral spring, 3, which bears against the bottom of the recess and the under side of the head of the bolt.

The operation is as follows: The chuck having been fastened by the set-screw, any annular article to be turned is slipped over the chuck, the nut D is forced down the screw-thread, the wedges B run up the inclined grooves $b$, rise above the screw-thread $a$, come in contact with the ends of the radial wedges B' and force them outward. This forces apart the sectional rim P and expands the mandrel E equally in all directions until it fills and holds the article to be turned. The bolts $t$ prevent the sectional rim from being forced entirely away from the disk N, and the springs 3 serve to bring the sections of the rim back against the disk N when the wedges B are withdrawn and the pressure on the radial wedges B' relaxed.

Having thus described my invention, what I claim as new, and desire to secure by Letters Patent, is—

1. The nut D, constructed substantially as described, in combination with the collar $i$, washer $o$, wedges B, and mandrel A, as and for the purpose set forth.

2. I also claim the nut D, constructed as described, in combination with the wedges B, mandrel A, and the expanding-chuck E, substantially as and for the purpose set forth.

3. I also claim the expanding-chuck E, constructed as described, in combination with the wedges and mandrel, substantially as and for the purpose described.

JOHN P. SIMONS.

Witnesses:
 JOHN WEBER,
 ED. L. LEONHARDT.